W. J. RICKETS.
ELECTRICAL ORDER TRANSMITTING SYSTEM AND THE LIKE.
APPLICATION FILED MAR. 6, 1915.

1,258,244.

Patented Mar. 5, 1918.
8 SHEETS—SHEET 1.

UNITED STATES PATENT OFFICE.

WILLIAM JOHN RICKETS, OF BROCKLEY, LONDON, ENGLAND, ASSIGNOR TO ALFRED GRAHAM & COMPANY AND WILLIAM JOHN RICKETS, BOTH OF BROCKLEY, LONDON, ENGLAND.

ELECTRICAL ORDER-TRANSMITTING SYSTEM AND THE LIKE.

1,258,244.  Specification of Letters Patent.  Patented Mar. 5, 1918.

Application filed March 6, 1915. Serial No. 12,554.

*To all whom it may concern:*

Be it known that I, WILLIAM JOHN RICKETS, a subject of the King of Great Britain and Ireland, residing at Brockley, in the county of London, England, have invented Improvements in or Relating to Electrical Order-Transmitting Systems and the like, of which the following is a specification.

This invention relates to means whereby mechanical movements are caused to produce electrical disturbances setting up other mechanical movements at a distant point or points such for instance as are necessary in signaling, in the transmission of range data in connection with artillery or the like, for indicating the position of a ship's helm and for any arrangement in which the movement of a mechanism at one point is required to follow with certainty the movement of a mechanism at another point.

Systems are known wherein signaling elements are moved in accordance with different current combinations in a plurality of signaling wires, and others in which motors are employed to move the signaling elements into the correct signaling position and while instrumentalities of this character are comprised in arrangements according to the present invention no claim is made broadly thereto.

The object of the present invention is to provide improved systems whereby permutating means at both a transmitting and a receiving station are so constituted as to secure the determination with exactitude at the receiving station of movements originated at the transmitting station, such movements being obtainable in excess of the total number of lines employed when these exceed four.

According to the invention a plurality of lines (hereinafter called "factor lines") are connected at one end at the transmitting device (hereinafter called a "transmitter") each to one or other of the two poles of current supply through switching means (hereinafter called a "permutator") while another permutator is employed at the receiving device (hereinafter termed a "receiver") to connect the distant terminations of the factor lines to the two poles of current supply in analogous ways. Two supply lines other than the factor lines are connected into each transmitter and receiver.

The movable members of the permutators at both the transmitter and receiver are adapted to occupy corresponding positions, the arrangement being such that when the positions are coincident both ends of each factor line are connected to one and the same pole of current supply so that no consumption of energy normally takes place.

If however the permutator at the transmitter be operated so that its position does not correspond with that of the permutator at the receiver one or more of the factor lines will be connected to one pole of the supply at the transmitter and to the opposite pole of the supply at the receiver, so that current will flow through such line or lines and either give an indication that the permutator may be actuated at the receiver to restore the balance, which act will determine the extent to which the permutator at the transmitter has been actuated, or automatically result in the permutator at the receiver being at once accurately moved to the required balancing position.

As each factor line may be brought to one or other of the two polarities employed and as each such state of polarity in one factor line may be combined with two states of polarity in each other factor line, the number of different permutations of polarity obtainable is equal to 2 raised to the power of the number of factor lines employed, or in other words, taking account of the fact that two supply lines are employed $2^{(n-2)}$ orders or movements may be dealt with by $n$ total lines.

In the accompanying drawings

Figure 1:
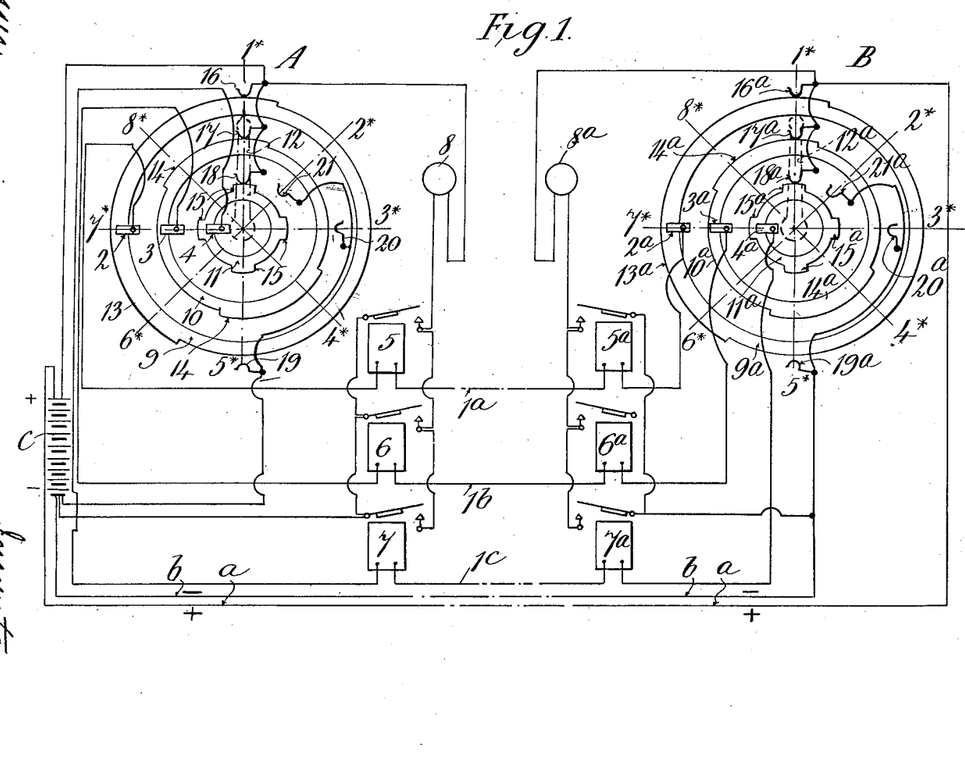
Figure 1 is a diagram of one arrangement according to the invention, Fig. 2 being a detail view of an intermittent gear mechanism suitable for use therein.

Referring first to Fig. 1, two supply wires $a$ and $b$ connected with the positive and negative poles of a source of electric energy such as a battery $c$, link the transmitter A with the receiver B. In this example three factor lines $1^a$, $1^b$, $1^c$ are employed terminating at the transmitter in three brushes 2, 3, 4 and at the receiver in three brushes 2ª, 3ª, 4ª, the said factor lines respectively including relays 5, 6 and 7 at the transmitter and a similar set of relays 5ª, 6ª, 7ª at the receiver. Each and all of the relays of each set can close the circuit of a corresponding indicating device 8 or 8ª such as a bell or other audible or visual signaling device.

At the transmitter A, three slip rings, 9, 10, 11 are shown, assumed to be mounted upon a drum, rotatable as by a pointer handle 12, the brushes 2, 3 and 4 coöperating with such slip rings. The ring 9 has a circumferential contact 13, the ring 10 two circumferential contacts 14, and the ring 11 four similar contacts 15 all adapted to coöperate intermittently with contact fingers 16 to 21 respectively, the fingers 16, 17, 18 constituting a set collectively connected to the positive pole of the battery and the fingers 19, 20, 21 a set connected to the negative pole of the battery. The arrangement of the contacts and contact fingers is such that at position 1* all the factor lines are connected to the positive pole of the battery, and for succeeding positions of the transmitter, the conditions, taking the lines in the order, 1ª, 1ᵇ, 1ᶜ, may be expressed thus:— 2nd position 2*, ++—; 3rd position 3*, +—+; 4th position 4*, +——; 5th position 5*, —++; 6th position 6*, —+—; 7th position 7*, ——+; 8th position 8*, ———.

The permutator at the receiver B is identical with the permutator at the transmitter A and the corresponding parts not specifically referred to are similarly designated but with the suffix "a".

It will now be readily seen that when the permutator at transmitter A occupies any definite position corresponding for example to an order, each of the factor lines remains connected to one or other of the supply wires, and if the distant receiver B stands at the same order the distant termination of the said factor lines are connected through the permutator to the same pole of the supply. Hence no current flows through any of the factor lines, no one of the relays 5, 6, 7, 5ª, 6ª and 7ª is energized and the indicators 8, 8ª remain inoperative. Should the receiver, however, not stand at the same order, which it ordinarily will not do when the transmitter is operated to alter an order, one at least of the factor lines will be connected to one pole of the supply at the transmitting end and to another pole at the receiver end. Under these conditions one or more relays of each set 5, 6, 7, and 5ª, 6ª, 7ª will be energized and remain energized until the operator at the distant end operates his receiver B to bring the permutator into coincidence with the permutator at the transmitter and bring all the factor lines to the same polarity at both ends, or until the operator at the transmitter A returns his permutator to the previous order position.

While distinction has been drawn between the transmitter and receiver the fact that they are identical in construction will make it clear that they are interchangeable and can be used to signal either way.

Figures 2, 4, 5:
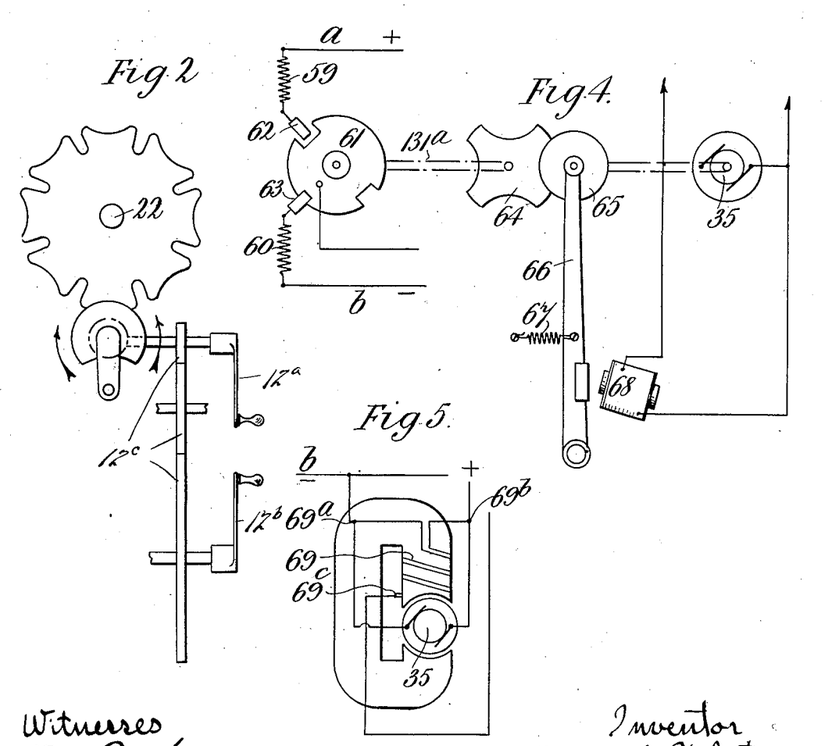

Each permutator, in lieu of being directly operated by a handle such as 12 may be actuated through an intermittent gear mechanism as indicated in Fig. 2 which gear will allow one definite movement for each order or signal that can be transmitted, the member 22 of the gear mechanism being fixed to the permutator.

The form of permutator shown in Fig. 1 is readily applicable when a small number of signals or orders are to be transmitted and it may be rotated by a motor in the manner hereinafter more fully described but when a larger number of signals or orders are to be dealt with a form of permutator may advantageously be employed in which the number of contacts is proportionately less, such improved permutator being preferable also where it is desired that the receiver shall automatically respond to the movements of the transmitter.

To this end the permutator is arranged to comprise a set of intermittent gears connecting switches, one for each factor line, in such a manner that when the first switch is moved or rotated so as to twice change the polarity of its connected factor line the next switch of the series is moved so as to change the polarity of its attached factor line once and so on up the series.

By such an arrangement the switches will be revolved so as to connect up the factor lines in all their possible polarity permutations if the first mentioned switch is continuously rotated.

Figure 3:
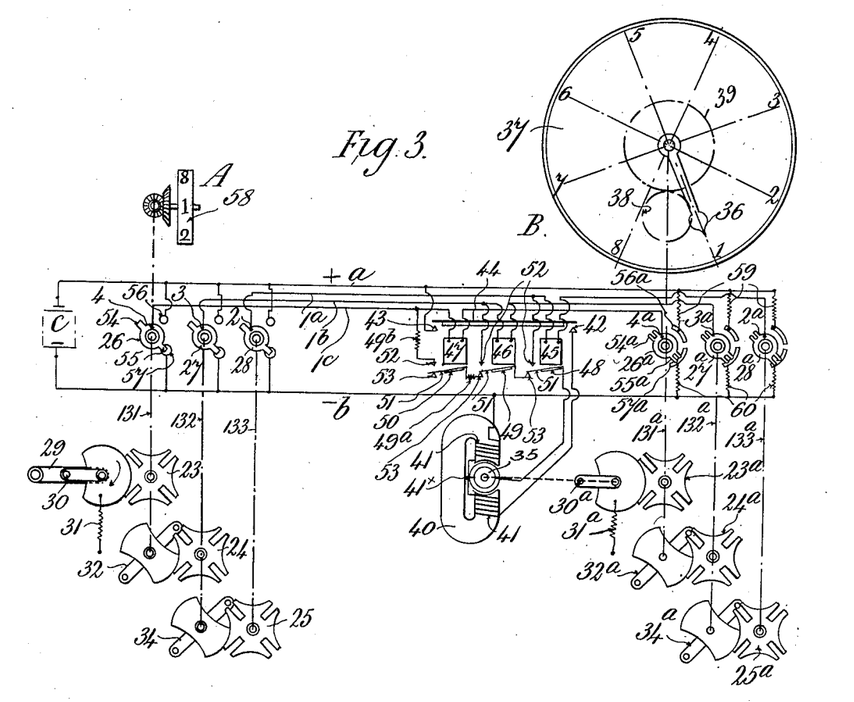
Fig. 3 is a diagram of another arrangement according to the invention and Figs. $3^a$, 4, 5, 6, 7 and 8 are diagrams of modified details which may be incorporated in the arrangement according to Fig. 3 and Figs. 9, 10, 11, 12, 13, 14 and 15 are diagrams of further modified arrangements.

One such arrangement of intermittent gears linking switches mechanically is shown in Fig. 3. Here three gear members 23, 24, 25 at the transmitter are respectively connected by spindles 131, 132, 133 to corresponding slip rings 26, 27, 28. The gear member 23 is shown as adapted to be rotated by a handle 29 through a companion pin member 30 controlled by a pull-off spring 31 serving to hold the pin in a definite position. The spring is connected by a stud at one side of the member 30 in a known way such that it does not interfere with rotation of the latter. The gear member 23 is connected by the spindle 131 to a pin member 32 companion to the gear member 24 while the latter is in turn connected by the spindle 132 to a pin member 34 companion to the gear member 25. Since the gear member 23 when rotated through two steps is arranged to produce movement of the gear 24 through a single step and the latter in turn when rotated through two steps produces movement of the gear 25 through one step it is convenient to refer to the said gears 23 and 25 as the "lowest" and "highest" respectively, the same conventionality being adopted no matter how many intermediate gears such as 24 may happen to be employed. The factor lines 1ª, 1ᵇ, 1ᶜ terminate, as before, in brushes 2, 3, 4 engaging the slip rings 28, 27 and 26 respectively at the transmitter A while at the receiver B they terminate in brushes 2ª, 3ª, 4ª coöperating with slip rings 28ª, 27ª, 26ª. The spindles 133ª, 132ª, 131ª of the latter are connected to intermittent gear members 25ª, 24ª, 23ª of gearing equivalent to that already described as provided at the transmitter. The pin member 30ª is however adapted to be operated by the rotor 35 of a motor 35, 40, directly or by gearing. The spindle of the lowest gear member 23ª carrying the slip ring 26ª may be directly or indirectly connected to the pointer 36 of a dial indicator 37, the figure as shown illustrating two to one gears 38, 39 provided for the purpose that two revolutions of the member 23ª, that is to say eight steps, are necessary to complete a revolution of the pointer.

Figures 3A, 14:
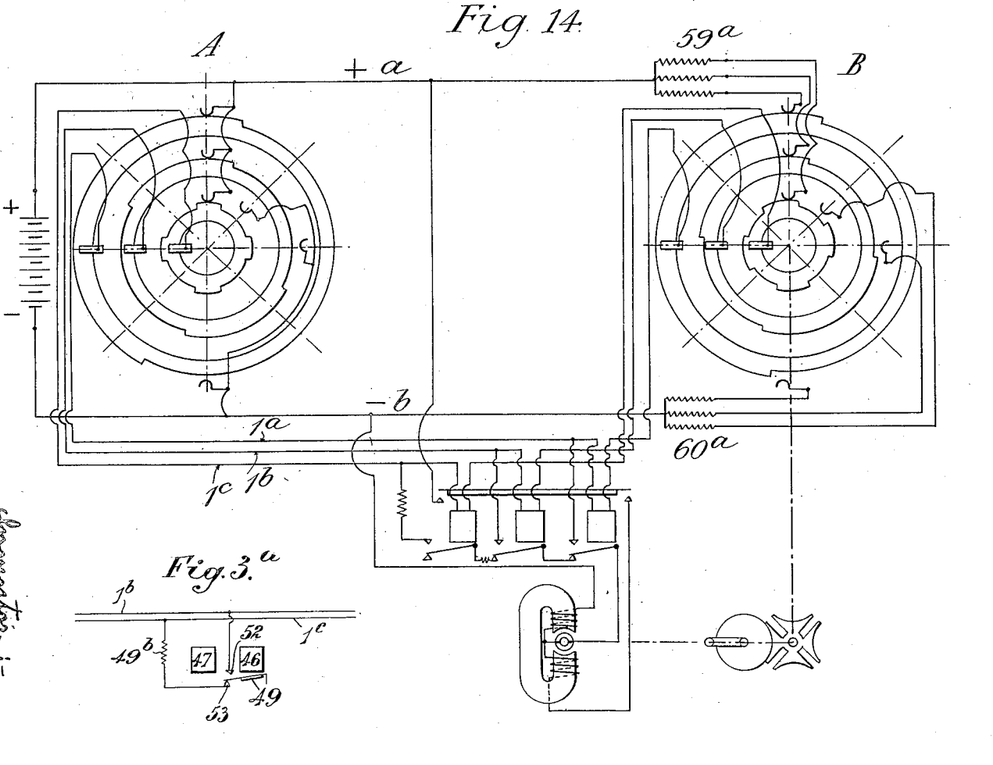

The motor stator 40 is provided with a field winding 41 one terminal of which is connected to one of the supply wires, $b$ in the example, while the other is connected to a switch contact 42 for connection to the opposite supply wire, say $a$, through another switch contact 43, the said contacts being bridged by a common member 44 upon energization of any one of three relays 45, 46, 47 included respectively in the factor lines 1ª, 1ᵇ, 1ᶜ. These relays 45, 46, 47 act in a double manner, being provided respectively with armatures 48, 49 and 50, besides the common armature 44. The armature 48 of the highest relay 45 is electrically connected to one brush of the motor armature 35 the other brush of which is connected to an intermediate point 41ˣ in the field winding 41, so that when the relay 45 is energized, the motor rotor 35 is connected to the factor line 1ª through contacts 51, 52. When however the relay 45 is idle and the armature 48 in normal position, its contact 51 engages a contact 53 connected to the armature 49 of relay 46 such armature serving to normally establish connection with the armature 50 of the lowest relay 47 and alternatively with the factor line 1ᵇ through its contact 52 while finally the said lowest armature 50 is adapted when the relay 47 is energized to establish connection through its contact 52 with the factor line 1ᶜ, though normally resting upon a dead contact 53. Thus when all the relays 45, 46, 47 are deenergized not only is the motor field circuit 41 open but also the rotor circuit, whereas the energizing of any one of the said relays to connect the rotor to a corresponding factor line is accompanied with closure of the field circuit. In some cases, if so desired, the armature 50 may be dispensed with, the armature 49 normally connecting directly with the lowest factor line 1ᶜ and alternatively with line 1ᵇ, this modification being shown in Fig. 3ª. A resistance 49ª or 49ᵇ or both resistances may be arranged as shown so as to come in the circuit of the armature 49 when current is taken from the lowest or two or more of the lower factor lines, in order that the speed of the armature may be reduced when the mechanism is approaching the state of balance and thus prevent overrunning of the armature.

The transmitter slip rings 26, 27, 28 are each provided with a pair of permutator brushes 54, 55 adapted to intermittently engage contacts 56, 57 connected respectively with the positive and negative supply wires, the arrangement being such that one or other brush 54, 55 normally lies on one or other contact 56, 57 and that each permutator acts to change the polarity of its allied signal line twice for one change of polarity of the next higher permutator. The lowest permutator may if desired be geared to an indicator 58.

It is desirable that when the motor has been started to transmit an order or signal it should not be possible to stop it in an intermediate position and this may be effected in various ways. In Fig. 3 this result is obtained by causing the permutator slip ring brushes 54ª, 55ª to coöperate with contacts 56ª, 57ª in the form of quadrants connected to the respective positive and negative supply wires through resistances 59, 60, the brushes being adapted to bridge for a short period the quadrant contacts 56ª, 57ª. Thus whenever the polarity of a factor line is altered at the transmitter A, a relay 45, 46, or 47 is energized with one or other of the resistances 59 or 60 in circuit, thereby starting the motor, and the permutator brush 54ª or 55ª or both will, in the course of movement cause the remaining resistance to be connected in parallel with the energized relay winding so that the latter does not become short circuited, this condition continuing until the balancing permutator contact 55ª or 54ª is alone in circuit with the factor line, when the balance is restored. This arrangement, coupled with the pull-off spring 31ª of the lowest pin member 30ª insures due return of the latter to a definite position.

The operation of the system according to Fig. 3 will be readily understood with the aid of the following description.

When the permutators at both the transmitter and the receiver are set at the same combination of polarities, or in other words at the same positions or orders, no current flows anywhere in the system. If an entirely different receiver were to be switched into connection with the said transmitter and its reading should differ from that of the transmitter it will immediately run until it agrees therewith and will come to rest at the exact order or signal to which the transmitter is set and at no other.

The electrical conditions are the same as obtain when the transmitter is operated to alter an order. Thus when a receiver does not coincide with its allied transmitter, current flows through all or some of the factor lines $1^a$, $1^b$, $1^c$ and their associated relays 45, 46, 47, in the receiver. The highest of the unbalanced relays so actuated connects its associated factor line to the rotor of the motor and according to the applied polarity of the said factor line, the motor runs in the required direction until the receiver end of such line is brought to the required polarity. The before mentioned relay now releases its armature and if during the previous operations the next lowest factor line has been unbalanced the corresponding relay has now connected the said line to the motor rotor and this continues to run until this second line is balanced as regards polarity and so on until all the factor lines are connected to the same pole at both ends or in other words until the receiver has arrived at the same order position as the transmitter.

The gearing and switches are such that the receiver always moves forward from or backward toward a zero or starting position when the transmitter is moved forward from or backward toward such position, until the balancing point is reached, whereupon the receiver indicates the same order as the transmitter.

Thus, referring to Fig. 3, wherein both transmitter and receiver are shown as standing at position 1,—let the transmitter be moved to position 2. Current now actuates relay 47 and connects line $1^c$ to the motor armature 35 in such manner that the direction of current flow is toward the point 41* through the armature windings; the motor now turns the gears and switches, into the position 2, agreeing with the position of the transmitter. The relay 47 is now deënergized and the circuit of the motor armature broken. Thus the receiver has moved forward one step to follow the transmitter.

Now let the transmitter be moved forward another step to position 3. The receiver is standing at position 2 at which position the lines $1^c$, $1^b$ and $1^a$ are respectively connected to $+$, $-$ and $-$. By supposition, the transmitter stands at position 3 at which the lines $1^c$, $1^b$, and $1^a$ are connected respectively to $-$, $+$ and $-$. Here both lines $1^c$ and $1^b$ carry current and both relays 47 and 46 are actuated but only line $1^b$ is connected to the motor armature, the connections to line $1^c$ being broken by the movement of armature 49 and the direction of current flow is the same as before, hence the armature turns in the same direction and when the switches have been moved one step forward, they have connected the lines $1^c$, $1^b$ and $1^a$ respectively to the poles $-$, $+$ and $-$ and both relays are released, thus the receiving mechanism stops at position 3 and has followed the transmitter one step.

By reference to the figure it will be seen that this always takes place. Thus if the transmitter is now moved forward to the sixth step or position, the receiver makes three steps forward and follows it exactly. For the lines $1^c$, $1^b$ and $1^a$ at position 3, connected to the $-$, $+$ and $-$ poles respectively and at position 6 these lines are connected to the $+$, $-$ and $+$ poles respectively. It will thus be understood that all the relays 47 and 46 and 45 are energized and also that only the "highest" line $1^a$ is connected to the motor armature 35 owing to the disconnection of both the lower lines $1^b$ and $1^c$ by the movement of armature 48. The direction of current flow through the armature is, as before, toward the point 41* and consequently the mechanism is moved forward two steps to position 5 under the influence of this current passing from line $1^a$. At position 5 the lines $1^c$, $1^b$ and $1^a$ are connected to the $-$, $-$ and $+$ poles respectively and thus it will be followed that at this point, the two upper relays 46 and 45 are released and allow the line $1^c$, by means of the relay 47, to become connected in turn to the motor armature. When this takes place, the flow of current is the same as before and the motor is moved forward the last step to position 6 which is the correct and coincident position at which the last relay is deënergized and the motor stops.

By moving say the transmtiter back to position 1 from position 6, the reverse action takes place. The polarity combination applied to the lines $1^c$, $1^b$ and $1^a$ at the transmitter is $-$, $-$ and $-$, the polarity combination at the receiver is $+$, $-$ and $+$. Hence now the two relays 47 and 45 operate, the lines $1^a$ being alone connected to the motor armature 35 and in this case, it will be seen that the direction of current flow through the armature 35 is from the point 41* to the negative pole at the transmitter end of the line $1^a$. The motor now rotates in the direction opposite to that previously described (i. e., so as to still follow the transmitter movement) the lowest relay 47 being deënergized as the receiver reaches the odd orders 5 and 3 and energized at the even positions 2 and 4. The second highest relay 46, which is not operative at positions 6 and 5, becomes energized at positions 4 and 3. Following the motor movement, it will now be found that the highest relay 45 is operative so that the motor drives the mechanism to position 4 by current derived from line 1ᵃ. At position 4, the next lower relay 46 is as before stated, operative and connects line 1ᵇ to the motor, disconnecting at the same time the lowest line 1ᶜ. The motor now moves the receiver to position 2 by current derived from line 1ᵇ and at this position, relay 47 is operative and connects the motor to line 1ᶜ. The motor is now run by current derived from this line, to position 1, at which position all the relays become inoperative and the motor stops.

It will thus be seen that the receiver or controlled mechanism moves so as to directly follow the transmitter or controlling mechanism and does not hunt up and down the scale of orders, signals or positions to indicate the correct order or reach the coincident position.

Figure 6:
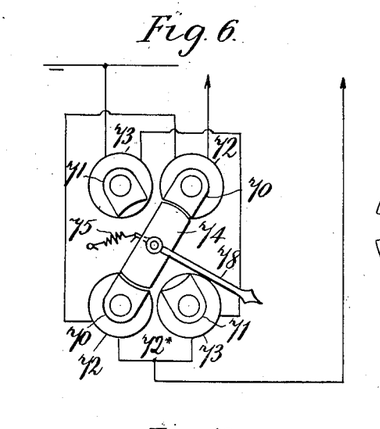

The same reasoning applies to the relay or indicator shown in Fig. 6 of the drawings, the movement of the armature of this relay being analogous to that of the motor armature 35.

In cases where it may not be desired that the motor should have to act against a load such as that due to the pull-off spring 31ᵃ of Fig. 3 during a part of its revolution, an arrangement such as shown in Fig. 4 may be employed where the pair of permutator switch quadrants 56ᵃ, 57ᵃ in Fig. 3 is replaced by an interrupted disk 61 which, when it is revolved, comes in contact with either or both of two stationary brushes 62, 63 connected through the resistances 59, 60 to the poles of the supply. When, on the system modified to embrace this arrangement, a receiver arrives at a point of balance, a final lock and adjustment may be obtained by securing to the spindle 131ᵃ of the lowest intermittent gear, which is driven from the motor, an indented disk 64 with which coöperates a roller 65 carried by a lever 66. This lever is being retracted against the action of a spring 67 by an electromagnet 68 energized when the motor circuit is complete so that the roller 65 is disengaged from the indented disk 64 while the motor is operative. When the motor is at rest the roller 65 is pressed by the spring firmly into contact with the disk 64, bringing the spindle 131ᵃ to a definite position. The number of lines used is not relatively great for a very large number of signals; for instance with a dial having 256 graduations ten lines only would be required to enable every graduation to be utilized.

The supply lines $a$, $b$ may be common to several signaling systems if so desired.

Fig. 5 indicates a manner of connecting the motor to the supply lines and relay system, the field circuit in this case comprising two windings 69 connected in series and arranged in magnetic opposition to each other and together in parallel with the rotor 35. One terminal say 69ᵃ of this arrangement may be permanently connected to one of the supply lines say $b$, the other terminal 69ᵇ being adapted to be connected to the opposite supply line as in Fig. 3 through the switch member 44 common to the several relays while a mid point 69ᶜ in the windings 69 of the motor field is adapted to be connected to one or other of the factor lines when any one of the said relays is actuated as already described. The effect of connecting the mid point 69ᶜ, of the field winding 69 to a positive supply line, in the specific arrangement shown, is to virtually short circuit one half of the winding while connection to the negative supply line virtually short circuits the other half of the winding. Such connection of the mid-point 69ᶜ effects a reverse field connection also.

If desired permutating mechanism such as shown at the transmitter in Fig. 3 may be connected up at both the transmitter and receiver in a system according to Fig. 1, the receiver in such case, as before, being hand operated, and also it is to be understood that the automatic system according to Fig. 3 may be modified to efficiently accommodate hand manipulation of the receiver by substituting for the motor a relay or indicator such as shown in Fig. 6. This relay indicates in which direction the mechanism must be turned or revolved to balance the system as described and when such balancing point has been attained. The relay consists of two pairs of pole pieces 70, 71 bearing coils 72, 73 which pairs of coils respectively take the place of the two windings 69 of the field coil shown in Fig. 5, the armature 74 of the relay being normally centralized by the action of a spring 75. When the system is unbalanced this relay is connected by the action of the relays 45, 46 and 47 in place of the motor and the two sets of coils 72 and 73 are in series connected across the supply mains. Their mid point 72* is connected by the relays to one or other of the factor lines 1ᵃ, 1ᵇ or 1ᶜ and according to the polarity of this line, one or other of the set of coils 72 and 73 is short circuited and the index pointer 78, acted on by the other set of coils, moves into one or other of the positions indicating lack of balance.

Figure 7:
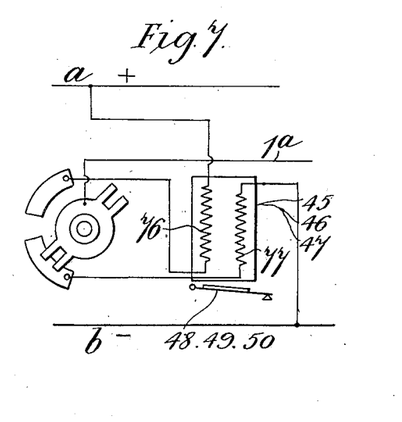

Fig. 7 illustrates a modification wherein the resistances 59 and 60 of Fig. 3 and Fig. 4 are replaced by separate windings 76, 77 with which each corresponding factor line relay 45, 46, or 47 may be provided.

Figures 8, 12, 15:
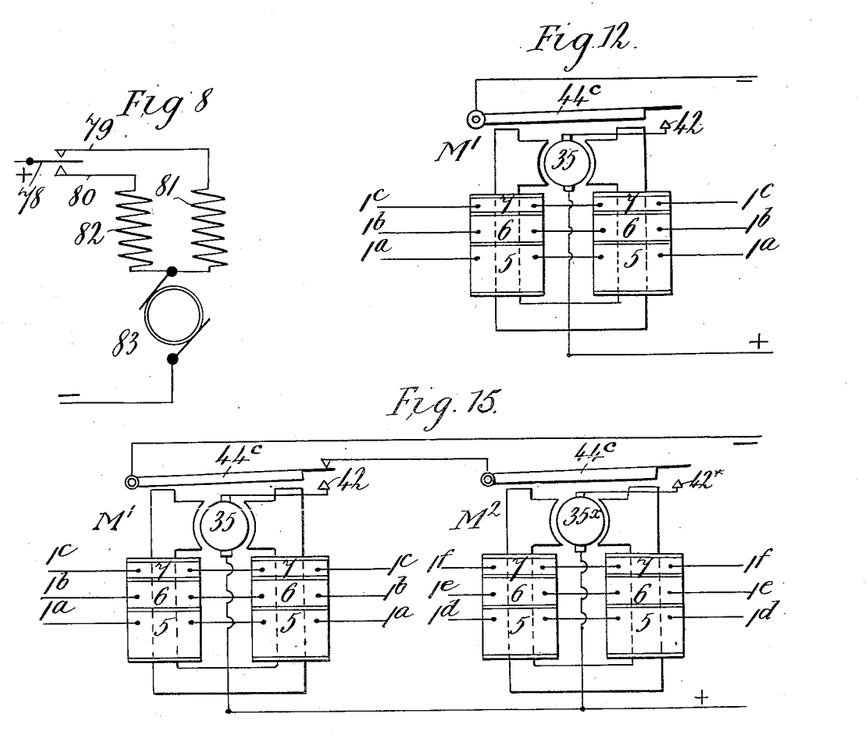

In Fig. 8 a third method of connecting the motor is indicated in which the moving index pointer 78 of the relay shown in Fig. 6 is modified to form a moving contact that is connected to one supply line and coöperates with either of the fixed contacts 79 and 80 to close a circuit through one or other of the field windings 81, 82 and rotor 83 of a series motor. The field windings 81 and 82 are wound in magnetic opposition. The contact 78 normally stands central and if moved on to one or other of the contacts 79 or 80 causes the motor to revolve in one direction or the other owing to the field reversal which takes place.

A system according to Fig. 3 with or without its modifications when employed for the transmission of ranges may be used in two ways.

In the first a single permutator and one motor as described are employed at the receiver, a counting train or like device being driven from the "lowest" spindle of the permutator and so arranged that its first cylinder or member shows four positions 25, 50, 75 and 100. One complete revolution of this cylinder is arranged in known manner to move the next cylinder one step. This cylinder is marked 0 to 9 and one complete revolution thereof moves another cylinder one step and so on. From this it will be seen that with ten factor lines and two supply lines making twelve factors in all (giving $2(^{n-2})$ indications as previously set forth) the counting train and associated switches may be set to any one of $2^{10}$ or 1024 positions. Thus as each position indicates in the given example a difference of 25 yards, any range from 0 to 25575 may be indicated in steps of 25 yards.

In the second manner of employing the invention supposing indications from 0 to 31975 yards by steps of 25 yards are to be given, the two first digit indicating drums (giving 31 from 00 that is to say 32 positions) are driven separately and form a distinct counting train having a distinct motor and associated permutators. This train would require five factor lines for its control. The last three digits up to 975 would be exhibited by two drums one marked 0 to 9 and the other 00, 25, 50 and 75. These two drums form in this case a second and separate train giving 40 steps of 25 yards from 000 to 975, also having a separate motor and associated permutators. The forty steps would require six factor lines to give the necessary permutations. Two supply lines common to both motors and sets of permutators would also be required. The second arrangement, except that it involves one additional factor line and one extra motor, has the advantage that less wear and tear takes place in the permutators and counting trains, and that the upper or thousands digits can be set independently of the lower digits.

When the transmitter may have to be moved through a great number of orders, two handles may be provided to rotate the permutators, one being connected to the spindle of the other by gearing so arranged that the said permutator can be rapidly rotated by the high speed handle and finally adjusted to the correct position by the slow speed handle. An example of such means is shown in Fig. 2 where $12^a$ represents the slow speed handle, $12^b$ the high speed handle and $12^c$ the gears connecting the handles together.

Figure 13:
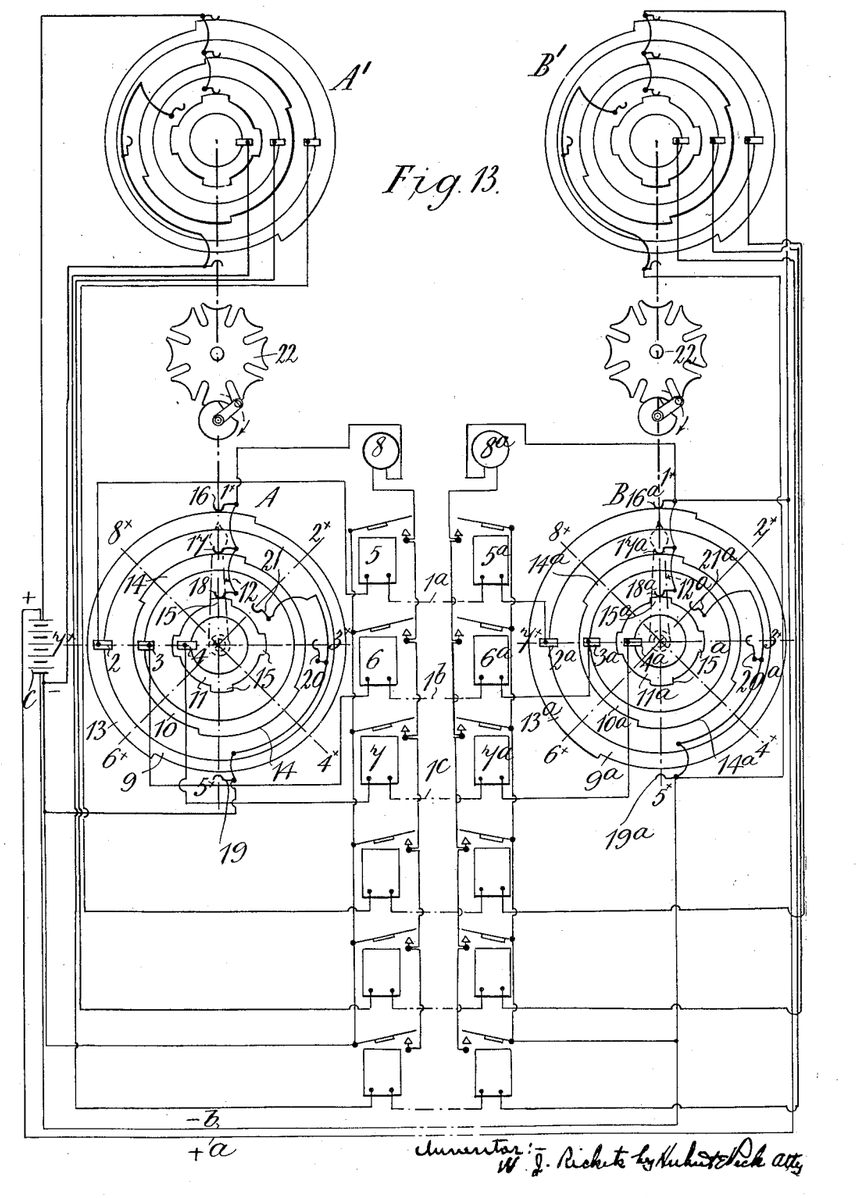

It will be further understood that drum permutators of the first described type may be used in combination, that is to say, that a drum switch of the description shown in Fig. 1 and controlling three factor lines, may, for example, be connected to a second and similar drum by intermittent gearing in such a manner that the second drum is rotated one step for one complete revolution or permutation cycle of the first drum which may be rotated by hand or motor as before. Such an arrangement is shown in Fig. 13 where the parts lettered correspond with those of Fig. 1 while those unlettered are duplicates, the duplicate permutators disposed at $A^1$ and $B^1$ being however arranged for rotation in the reverse direction to those at A and B, rendered necessary by the employment of the intermittent gear mechanism, such as that of Fig. 2, used for causing the permutators at $A^1$ and $B^1$ to move one step as the permutators at A and B complete their eighth step. Also, these drums, or a single drum when such is used, may have circumferential contacts modified in length so as to coöperate with resistance windings in the manner set forth with reference to the motor control.

The transmitter may be set by hand or it may be connected with any moving mechanism, such as a turret, a ship's shaft or the helm of a ship by known gearing, and thus be employed to indicate at a distance the position of any such part or structure.

Permutator switches of types other than rotary as herein referred to may be employed.

In Fig. 3 the relays 47, 46 and 45 are energized through resistances by means of which they are energized to some extent while the mechanism is passing from one definite position to another without a direct short circuit of the supply lines being produced. This arrangement while advantageous in that the relays have only one energizing winding, is one in which some waste of energy takes place in the resistances.

In the alternative arrangement of Fig. 7 relays are employed having two windings in lieu of the resistances referred to in which case no energy is wasted during the carrying over process, but this arrangement may in some cases be considered disadvantageous on account of such separate windings requiring separate connection to the permutating switch elements.

These disadvantages can be avoided by appropriate modification.

Figure 9:
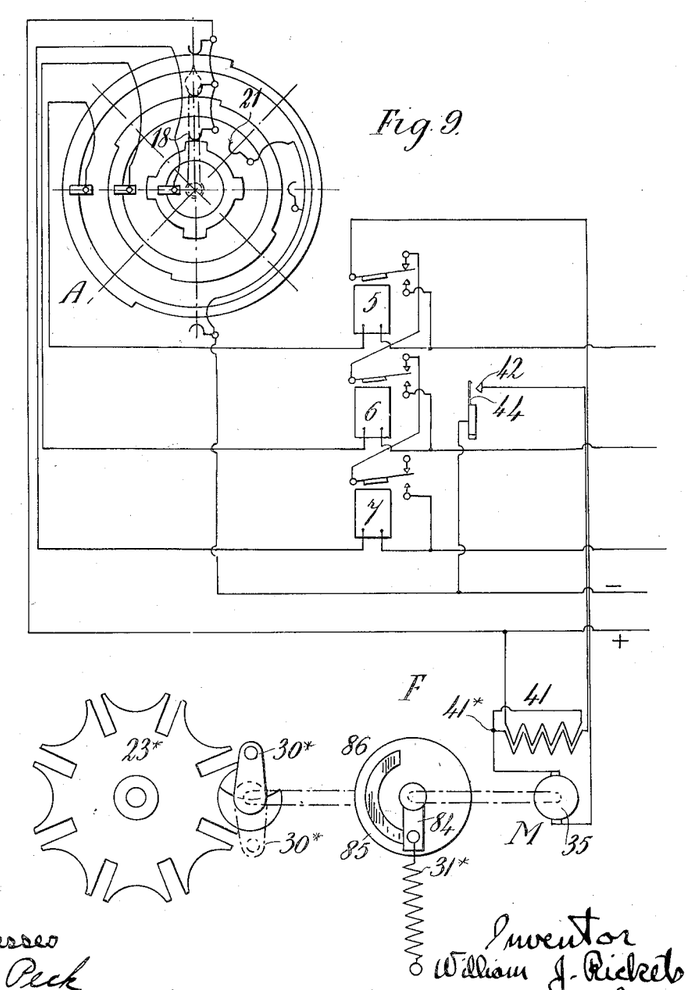

Thus, as shown in Fig. 9 a permutator switch of the type indicated at A in Fig. 1 is rotated in definite steps by means of a motor M, through intermittent mechanism 23* and 30* of the Maltese cross type, driven by energy stored up in a spring 31* assisted at some points by the motor M. The spring 31* acts through the fly-over mechanism F which comprises, in the example shown, a crank 84 fixed upon the shaft of the motor armature 35 and to which the spring 31* is attached, and an element 85 carrying a stop 86 against which the crank 84 may bear. The element 85 may, as shown, be a disk or flange and is fixed on the spindle of the element 30*. In the example the crank 84 is rotated by the motor M directly, though in some cases it may be rotated indirectly, until the spring 31* is completely extended, after which further turning is assisted by the spring so as to definitely move the mechanism one step. The arrangement is such that although the gear member 30* and associated stop element 85 may occupy different angular positions at different times, as exemplified by the dotted lines applied to the element 30*, no work is performed against the gear element 23* until after the crank 84 has turned through an angle of 180° in either direction. For instance, assuming the parts to be in the full line position shown, turning of the crank in clockwise direction will cause a clockwise movement of the member 30* into the dotted position without influencing the gear member 23*, the spring 31* completing the operative movement. If on the other hand the crank were to be turned in the opposite direction, the first half revolution of movement would be without effect upon the stop element 85 so that the member 30* will remain stationary until the spring 31* is again in position to complete the operative movement. During the later portion of the movement of the crank 84 the circuit of the relay for the time being controlling the motor M may be broken as for example at the contacts 18 or 21 on the permutator switch if the relay 7 be assumed to be the one in use, whereby the motor circuit becomes dead. The motor will however by the arrangement described always be assisted by the spring 31* during that part of its motion which causes the actual movement of the permutator switch so that the latter is definitely carried over and does not stop in an intermediate position. Mechanically equivalent spring actuated fly over mechanism of any other known or suitable kind, may, if desired, be used in place of the exact arrangement hereinbefore described.

The field windings 41 and armature 35 of the motor M are connected at the point 41* and by the relays 5, 6 and 7 are connected across the supply lines + and − through a common armature 44 coöperating with a contact 42, each relay and its associated parts operating exactly in the same way as the equivalent elements 47, 46 and 45; 44 and 42 and 41 and 35 of Fig. 3 already described.

Figure 10:
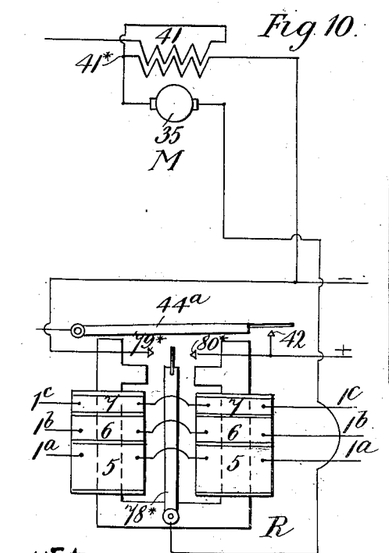

In Fig. 10 a modification is illustrated according to which the separate relays, such as 5, 6 and 7, are combined in one relay R. This combined relay has a non-polarized armature 44$^a$ coöperating with a contact 42 to close the supply circuit to motor M in the manner previously mentioned when any of the coils 5, 6 or 7 are energized. The relay also has a polarized armature 78* adapted to turn in either direction and arranged to coöperate with either of two contacts 79* and 80* for the purpose of connecting the armature 35 of the motor M to either pole of the electric supply so that it rotates in one or other direction. The coils 7 of the relay are connected with the "lowest factor line" 1$^c$.

The "higher factor lines" 1$^b$ and 1$^a$ are respectively connected to coils 6 and 5.

It will be readily understood that if now any of these lines are energized the armature 44$^a$ is attracted and the armature 78* moved from its normal central position to start the motor M, which rotates until all the coils are deënergized and both armatures released.

Figure 11:
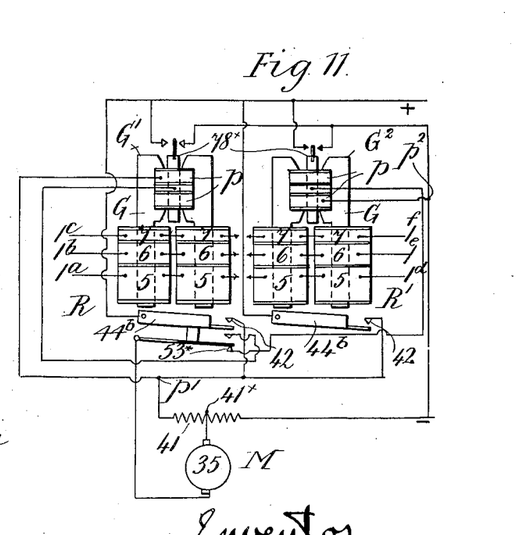

It is important that the magnetic effect on the relay armatures due to a "higher factor line" current shall predominate over a possible opposite effect due to the sum of all the currents in the "lower factor lines" connected to the same relay. To this end, it is preferably arranged that the magnetic forces due to each successive set of coils 7, 6, 5, on the relay core are in geometrical proportion. Thus, the coils 7 would have a magneto-motive force of 1, the coils 6 a magneto-motive force of 2 and the coils 5 a magneto-motive force of 4. Then reckoning magneto-motive forces in one direction through the relay as + and in the other as − the higher line will always have predominance, for if it gives +4 units of magneto-motive forces and both the other windings are opposed, then the resultant will be +4−(2+1) or 1. If the highest line is balanced and has no current in it and the next lower is opposed to the lowest the resultant is then +2−1=1 as before, and the relay being designed to act with full force for a magneto-motive force of 1, the action is definite and complete under all circumstances.

Where a large number of "factor lines" are employed it becomes cumbrous to employ one relay as the size greatly increases if the highest factor line is to have a large and predominant magnetic winding. It is therefore more satisfactory to divide the lines into groups as indicated in Fig. 11 in which several detail modifications are illustrated. Here "six factor lines" are used which with the two + and − supply lines constitute eight line wires altogether. This enables 64 separate definite positions of the movable permutator element to be obtained. These factor lines are divided into two groups $1^a$, $1^b$, $1^c$ and $1^d$, $1^e$, $1^f$, each connected to one of two similar relays R and $R^1$. Each of these relays consists of an electro-magnet G having three windings 5, 6 and 7 one connected to each of the "factor lines" $1^a$, $1^b$ and $1^c$ and $1^d$, $1^e$, $1^f$. The magnetic circuit is at one extremity completed by the armature $44^b$ and at the other extremity by the poles $G^1$ and $G^2$ are bifurcated and embrace the coils $g$, which in this arrangement bridge the motor circuit, at the points $p^1$, $p^2$ and polarize the armature $78^*$ when the supply mains are connected to the motor circuit by the movement of either armature 44 on to its contact 42.

The advantages of this system of polarization are (1) that the apparatus does not depend on a permanently polarized armature; (2) that owing to the disposition of the magnetic circuit the polarized armature does not tend so much to cling to one side when moved over and is furthermore depolarized when the system is balanced, allowing it to be brought central with a much smaller controlling force and (3) that the apparatus is not affected by changes of polarity as is a permanently magnetized system.

It will be seen from the figure that if relay R is operative, that is if one of the three "higher factor lines" $1^a$, $1^b$, $1^c$ be energized, the control of the armature 35 of the motor M is effected by relay R alone as the connection to the polarized armature $78^x$ of relay $R^1$ is broken at contact $53^*$. When all the three "higher factor lines" corresponding to relay R are balanced, the armature 35 is connected to $78^x$ of relay $R^1$ by the closure of the circuit at $53^*$ and if either of the lines $1^d$, $1^e$ or $1^f$ is unbalanced, the armature $78^x$ is correspondingly moved and the motor rotates to bring the system to a state of balance.

In Figs. 9 to 11 the alternative method of connecting the motor illustrated in Fig. 5 may be employed as will readily be understood upon reference thereto.

In Fig. 12 a combination of motor and relay is shown producing greater simplicity in the system, particularly where a few "factor lines" are required, say up to 4, 5 or 6 giving respectively 16, 32 or 64 orders or positions. Here a motor $M^1$ which drives the permutative devices through flyover mechanism, preferably of the type hereinbefore described, is provided with a relay armature $44^c$ which, in coöperation with a contact 42, closes the circuit of armature 35 when the motor field magnet is excited. The field magnet is wound with a coil or coils, two are shown, for each "factor line" and the magnetic effect of each coil is graded according to its position in the series, each coil preferably having double the magnetic effect of the preceding one. The coils being thus in a geometric series, the coil connected to the highest "factor line" alive obtains predominance and magnetizes the field magnet in one direction or the other, the armature $44^c$ is attracted and the motor armature 35 is rotated until the permutative switch arrives at the correct position when all the coils become dead and the motor stops.

When a large number of "factor lines" are employed an arrangement such as shown in Fig. 12 will become large for the power required owing to the size and number of the necessary field coils. It is therefore in this case desirable to use two or more motors actuating, directly or indirectly, the same spindle and connected in a manner analogous to that of the relays R and $R^1$ in Fig. 11. Such an arrangement is exemplified in Fig. 15 in which two motors $M^1$ and $M^2$ are shown each having their fields wound with a plurality of coils connected to a group of factor lines. The armature $44^c$ of the first combined motor $M^1$ and relay when attracted breaks the circuit of the motor armature $35^x$ of the second combined motor $M^2$ and relay until all the steps corresponding to the factor permutations of the first motor have been made and this motor is consequently deënergized. The combined motor $M^2$ and relay are then free to act in a similar manner.

What I claim is:—

1. A system of the kind herein referred to, comprising a source of electric current, two similar permutators, a pair of supply leads connecting the permutators with opposite poles of the source of electric current, a relay arrangement and a plurality of factor lines associated with such relay arrangement, the said permutators when they occupy coincident positions connecting both ends of each factor line to one and the same pole of current supply so that no consumption of energy normally takes place.

2. A system of the kind herein referred to comprising a combination of two electric supply leads, a plurality of factor lines, permutators for establishing connection between the factor lines and supply leads in varying permutation, a relay arrangement associated with the factor lines and adapted to remain inactive when the permutators occupy coincident positions and motor means controlled by the relay arrangement and adapted to restore one permutator to a position of coincidence with the other permutator when the latter is moved to disturb the coincidence.

3. A system of the kind herein referred to, comprising a source of electric current, two similar permutators, a pair of supply leads connecting the permutators with opposite poles of the source of electric current, a plurality of factor lines, one or more of which will be connected to one pole of the source of electric current at one permutator and to the opposite pole of the source at the other permutator when such permutators do not occupy coincident positions, and a relay arrangement influenced by current flowing in any such live factor line or lines.

4. A system of the kind herein referred to, comprising a source of electric current, two similar permutators, a pair of supply leads connecting the permutators with opposite poles of the source of electric current, a plurality of factor lines, one or more of which will be connected to one pole of the source of electric current at one permutator and to the opposite pole of the source at the other permutator when such permutators do not occupy coincident positions, a relay arrangement influenced by current flowing in any such live factor line or lines and a motor controlled by the relay arrangement adapted to move one permutator into coincidence with the other.

5. In a system of the kind herein referred to, the combination with a pair of electric supply leads, a plurality of factor lines, a series of permutator switches associated therewith and a motor adapted to restore certain of said switches to a position of coincidence with the remainder when such coincidence is disturbed, of a relay arrangement comprising a plurality of windings associated with the several factor lines, the energizing of any single relay winding serving to connect the field circuit of the motor to the supply leads.

6. In a system of the kind herein referred to, the combination with a pair of electric supply leads, a plurality of factor lines, a series of permutator switches associated therewith and a motor adapted to restore certain of said switches to a position of coincidence with the remainder when such coincidence is disturbed, of a relay arrangement comprising a plurality of windings associated with the several factor lines, the energizing of any single relay winding serving to connect the field circuit of the motor to the supply leads and also to selectively connect the armature of the motor to the factor lines.

7. In a system of the kind herein referred to, the combination with permutators and a motor adapted to restore one permutator to a position of coincidence with the other when the latter is moved to disturb the coincidence, of a spring actuated fly-over mechanism through which the motor actuates such permutator.

8. A system of the kind herein referred to, comprising factor lines divided into groups, a relay associated with each such group, a motor, a relay armature, an arrangement adapted to complete the motor circuit under the control of any factor line and means interconnecting the relays whereby the factor lines of a "lower" group shall be ineffective while any factor line of a higher group is effective.

9. A system of the kind herein referred to, comprising a combination of two electric supply leads, a plurality of factor lines, a series of permutator switches for establishing connection between the factor lines and supply leads in varying permutation, a relay arrangement associated with the factor lines and adapted to remain inactive when the permutator switches occupy coincident positions and intermittent gearing connecting the permutator switches of each group aforesaid, the said intermittent gearing being adapted to cause each switch to be moved and change the polarity of the allied factor line twice for one change of polarity of the switch next higher in order.

10. A system of the kind herein referred to, comprising a combination of two electric supply leads, a plurality of factor lines, a series of permutator switches for establishing connection between the factor lines and supply leads in varying permutation, a relay arrangement associated with the factor lines and adapted to remain inactive when the permutator switches occupy coincident positions, intermittent gearing connecting the permutator switches of each group aforesaid, the said intermittent gearing being adapted to cause each switch to be moved and change the polarity of the allied factor lines twice for one change of polarity of the switch next higher in order and resistances through which the factor lines are adapted to be connected to both supply leads at intermediate positions of the permutator switches during the process of changing polarity.

Signed at London this fourth day of February 1915.

WILLIAM JOHN RICKETS.

Witnesses:
O. J. WORTH,
A. NUTTING.